United States Patent [19]

Nilsson

[11] 4,369,825
[45] Jan. 25, 1983

[54] MULTIPLE WHEEL TIRE WITH REDUCED NOISE

[76] Inventor: Nils-Ake Nilsson, Erikslundsvägen 348, Täby, Sweden, S-183 44

[21] Appl. No.: 190,765
[22] PCT Filed: Jul. 10, 1979
[86] PCT No.: PCT/SE79/00150
§ 371 Date: Mar. 7, 1980
§ 102(e) Date: Mar. 7, 1980
[87] PCT Pub. No.: WO80/00235
PCT Pub. Date: Feb. 21, 1980

[30] Foreign Application Priority Data

Jul. 10, 1978 [SE] Sweden .................. 7807693

[51] Int. Cl.³ .................. B60E 5/00; B60E 7/00
[52] U.S. Cl. .................. 152/157; 152/209 R; 152/311; 152/352 R
[58] Field of Search .......... 152/331, 301, 339, 340, 152/341, 342, 330 RF, 209 R, 376, 310, 311, 313, 312, 318, 157, 158, 352 R, 353 R

[56] References Cited

U.S. PATENT DOCUMENTS

| 812,893 | 2/1906 | Sobers .................. 152/376 |
| 1,263,356 | 4/1918 | Altenburg .................. 152/314 |
| 1,662,208 | 3/1928 | Pounds .................. 152/376 |
| 1,708,339 | 4/1929 | Tannenbaum .................. 152/301 |
| 3,463,552 | 8/1969 | Collette .................. 152/376 |
| 3,486,545 | 12/1969 | Niclas et al. .................. 152/155 |

FOREIGN PATENT DOCUMENTS

| 1505877 | 6/1976 | Fed. Rep. of Germany . |
| 1197547 | 7/1970 | United Kingdom . |
| 1485404 | 9/1977 | United Kingdom . |

OTHER PUBLICATIONS

Richards, "Automative Noise, a Comprehensive Study" Sound and Vibration, May 1974, pp. 42–47.

Primary Examiner—Michael W. Ball
Attorney, Agent, or Firm—Griffin, Branigan & Butler

[57] ABSTRACT

The present invention discloses a vehicle tire, which radiates low external tire/road rolling noise and comprises a rim (1) to the periphery of which a multiplicity of in axial direction separated sub-tires (5) are attached, each of which has an outer diameter/sectional width ratio (2r/b), which is greater than 8. These individual sub-tires are, for further improved noise characteristics, entirely filled with soft rubber or a soft plastic material.

6 Claims, 1 Drawing Figure

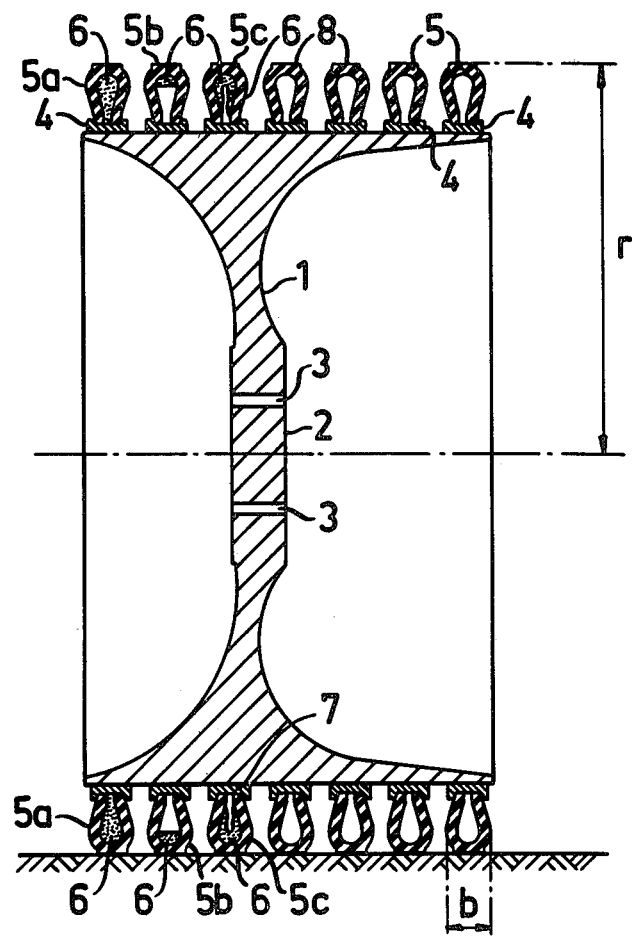

MULTIPLE WHEEL TIRE WITH REDUCED NOISE

BACKGROUND

The present invention concerns a vehicle tire with reduced rolling noise emission and a method for its manufacture.

A considerable environmental problem in today's society is noise emission from roads and streets. At lower speeds and high acceleration, the noise from the power unit dominates at the receiver point in most cases compared to the rolling noise.

At speeds exceeding 50 km/h, however, rolling noise created by the tire contact with the road will dominate. This means that a great portion of the noise problems that exist along streets and roads even in urban areas are caused by tire/road noise. For those areas it would not help much to further reduce the noise emission from the power units. The fact that the tire/road rolling noise dominates the total noise emission for most conditions at speeds exceeding 50 km/h contributes to a certain understandable disinclination of car manufacturers to further reduce the noise emission from the power unit. A reduction of the tire/road rolling noise would thus contribute directly to solve noise problems at streets and highways where speed is higher than 50 km/h and also contribute to a general reduction of the road traffic noise at lower speeds, as reduced rolling noise would increase motivation also for power unit noise reduction. There are mainly three known methods up to now on how to reduce tire/road rolling noise.

1. Changing the tread pattern. The length of different tread blocks is varied in the direction of rotation so that the tonal components of the noise emission is spread around the mean frequency.

2. Changing the rubber compound so that higher compliance is obtained.

3. Influencing the texture of the road surface to obtain an optimal texture depth with respect to noise.

The first method can probably not give any further noise reduction because of an already well developed technique. The tonal contribution to the total noise emission is less dominating for coarse road surfaces, as the random road surface excitation of the tire would dominate noise emission in these cases. The second method cannot be used without some increase of tire wear. It gives noise reduction but is not acceptable from an economical point of view.

In co-pending application PCT/SE79/00152 is disclosed a vehicle tire, which radiates little external noise. This has been achieved among others by the tire having an outer diameter/sectional width ratio which is greater than 8. For a further reduction of the radiated noise the tire is also totally or partially filled with soft rubber or the like.

In certain cases though it might be difficult to find a tire which fulfills the desired outer diameter/sectional width ratio without its bearing capability and/or its contact surface being decreased.

The object of the present invention is to disclose a vehicle tire which, while maintaining the desired bearing capability and/or contact surface to the road, yet radiates little external noise.

According to the present invention this has been achieved by mounting several individual tires on a rim of a suitable dimension, each tire having an outer diameter/sectional width ratio greater than 8. The tires can be filled with only compressed air or soft rubber (or the like) or only partially with soft rubber and the remaining part of the cavity with compressed air.

A conventional tire must have a so called "crown-radius", i.e. the tire tread has a certain curvature perpendicular to the tire rotation direction. This means that the tire has a larger gross diameter in the middle of the tread compared to the gross diameter at the edges or shoulders of the tread surface. The reason for this is that the middle of the tread surface should have essentially the same contact pressure compared to the edges and shoulders of the tread surface. Thus, the middle portion of the tread surface must be pressed in towards the wheel center at contact with the road surface during the rolling of the tire and thereafter, when the tread rubber leaves the road contact, elastically spring back to its original form. These deflections, and especially the "snap"-deflection at the tread release, contribute to a great extent to the generated external noise. Through the fact that the partial-tires according to the invention are so narrow, they can be made with an essentially plane tread surface (seen in cross section), also allowing the existence of some kind of tread pattern.

The invention will be further described with reference to the annexed drawing, which shows an axial cross section through an embodiment of a wheel according to the invention.

The wheel shown in the drawing consists of a main rim 1, which is provided with a hub 2 with holes 3 for mounting on a shaft. On the periphery of the main rim 1 several sub-rims 4 are arranged in a suitable way and with axial play. Each of the sub-rims 4 supports a tire 5, which has an outer diameter/sectional width ratio (2r/b) greater than 8 and which in a conventional manner could be filled with compressed air.

Already the said dimensioning of the tires involves a reduction of radiated noise from the rolling tire. To obtain a further reduction of the radiated noise, the inner cavities of the tires 5 could entirely (tire 5a) or partially (tires 5b and 5c) be filled with soft rubber or a soft elastomeric or plastic (resin) material 6, which preferably should have a hardness of less than 35° Shore A. In case the tires are only partially filled with a soft polymeric material, the remaining part of the cavity is filled with compressed air. In the tire 5b the soft rubber merely fills the outer parts (in a radial direction) of the cavity while in tire 5c the rubber material also extends along the inside of the tire side-walls up to the tire foot 7. The tread surfaces 8 of the tires 5 are in the shown example essentially plane in sectional view. Thereby the above-mentioned, noise generating deflection in the tread rubber is avoided.

The sub-rims 4 can be manufactured in one piece with the main rim 1, which in such a case is provided with a number of continuous circumferential grooves corresponding to the number of tires, the edges of which correspond to the inner surfaces of the sub-rims 4, or twice as many continuous circumferential tire beads or protrusions between two of which the tires are mounted.

The rubber or plastic filling 6 should be of a material absorbing structureborn sound and having a high loss factor.

I claim:

1. A vehicle wheel having low rolling noise comprising:

a rim located about an axis of said wheel;

a plurality of tires mounted on said rim, each of said tires having an inner cavity and being axially separated from each other;

each of said tires having an outer-diameter/sectional-width ratio (2r/b) of greater than 8 wherein 2r is the outer diameter of said tire and b is the cross-sectional width in the axial direction of each individual tire; and, each of said cavities being filled with a filler material having a hardness of less than 35° Shore A (DIN 53 505).

2. The wheel of claim 1 wherein said filler material is rubber.

3. The wheel of claim 1 wherein said filler material is a plastic.

4. The wheel of claim 1 or 2 or 3 wherein each of said tires has a tread surface that is essentially plane when viewed in cross-section.

5. The wheel of claim 1, wherein each of said tires are mounted on a corresponding sub-rim member, and wherein each of said sub-rim members are in turn mounted on said rim.

6. A method of reducing rolling noise on a vehicle including the steps of:

providing said vehicle with wheels each having a plurality of tires mounted on a wheel rim member thereon and each tire having a cavity therein;

structuring each of said tires so that the outer-diameter/sectional-width ratio (2r/b) is greater than 8 wherein 2r is the outer diameter of each said tire and b is the cross-sectional width thereof in the axial direction; and filling each of said cavities with a filler material having a hardness of less than 35° Shore A (DIN 53 505).

* * * * *